(12) United States Patent
Fricke et al.

(10) Patent No.: US 10,125,232 B2
(45) Date of Patent: Nov. 13, 2018

(54) PROCESS FOR PRODUCING FLAME-RETARDANT POROUS MATERIALS BASED ON POLYUREA

(71) Applicant: BASF SE, Ludwigshafen (DE)

(72) Inventors: Marc Fricke, Osnabrueck (DE); Mark Elbing, Bremen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/225,969

(22) Filed: Mar. 26, 2014

(65) Prior Publication Data

US 2014/0206783 A1 Jul. 24, 2014

Related U.S. Application Data

(63) Continuation of application No. 13/422,704, filed on Mar. 16, 2012.

(60) Provisional application No. 61/453,976, filed on Mar. 18, 2011.

(51) Int. Cl.
| | | |
|---|---|---|
| C08G 18/32 | (2006.01) | |
| C08G 18/38 | (2006.01) | |
| C08J 9/00 | (2006.01) | |
| C08J 9/28 | (2006.01) | |
| E04B 1/74 | (2006.01) | |
| C08G 101/00 | (2006.01) | |

(52) U.S. Cl.
CPC ........ C08J 9/0038 (2013.01); C08G 18/3243 (2013.01); C08G 18/381 (2013.01); C08G 18/388 (2013.01); C08G 18/3819 (2013.01); C08J 9/28 (2013.01); C08G 18/3237 (2013.01); C08G 2101/0091 (2013.01); C08J 2201/0502 (2013.01); C08J 2375/02 (2013.01); E04B 2001/742 (2013.01)

(58) Field of Classification Search
CPC ........ C08G 18/3237; C08G 2191/0091; C08G 2101/0091
See application file for complete search history.

(56) References Cited

U.S. PATENT DOCUMENTS

| | | |
|---|---|---|
| 4,404,294 A | 9/1983 | Wiedermann |
| 5,382,616 A | 1/1995 | Stanssens et al. |
| 5,478,867 A | 12/1995 | Tabor |
| 5,484,818 A | 1/1996 | De Vos et al. |
| 5,942,553 A | 8/1999 | Biesmans et al. |
| 5,990,184 A | 11/1999 | Biesmans |
| 6,063,826 A | 5/2000 | Biesmans et al. |
| 7,521,485 B2 | 4/2009 | Albert et al. |
| 2004/0030011 A1* | 2/2004 | Buszard ............ C08K 5/12 524/127 |
| 2007/0191538 A1 | 8/2007 | Apichatachutapan et al. |
| 2010/0148109 A1 | 6/2010 | Schaedler et al. |
| 2010/0239815 A1 | 9/2010 | Senkfor et al. |
| 2011/0263742 A1 | 10/2011 | Zarbakhsh et al. |
| 2012/0067499 A1 | 3/2012 | Elbing et al. |
| 2012/0232180 A1 | 9/2012 | Kunst et al. |
| 2014/0127495 A1 | 5/2014 | Fricke et al. |

FOREIGN PATENT DOCUMENTS

| | | |
|---|---|---|
| DE | 103 02 198 | 7/2004 |
| EP | 0 005 903 | 12/1979 |
| WO | WO00/24799 A1 | 5/2000 |
| WO | WO 01/18371 | 3/2001 |
| WO | WO 2008/138978 A1 | 11/2008 |
| WO | WO 2009/027310 A1 | 3/2009 |
| WO | WO 2010/015642 | 2/2010 |
| WO | WO 2011/000771 A2 | 1/2011 |
| WO | WO 2011/018371 A1 | 2/2011 |
| WO | WO 2011/045306 A1 | 4/2011 |
| WO | WO 2011/069959 A2 | 6/2011 |
| WO | WO 2011/134856 A1 | 11/2011 |
| WO | WO 2011/134866 A2 | 11/2011 |
| WO | WO 2012/000917 A1 | 1/2012 |
| WO | WO 2012/038215 A1 | 3/2012 |
| WO | WO 2012/059388 A1 | 5/2012 |
| WO | WO 2012/113759 A1 | 8/2012 |
| WO | WO 2012/119970 A2 | 9/2012 |

OTHER PUBLICATIONS

Russian Office Action dated Apr. 11, 2016.

* cited by examiner

*Primary Examiner* — Melissa A Rioja
(74) *Attorney, Agent, or Firm* — Oblon, McClelland, Maier & Neustadt, L.L.P.

(57) ABSTRACT

The present invention relates to a process for producing flame-retardant porous materials comprising the following steps:
(a) reacting at least one polyfunctional isocyanate (a1) and at least one polyfunctional aromatic amine (a2) in an organic solvent optionally in the presence of water as component (a3) and optionally in the presence of at least one catalyst (a5); and then
(b) removing the organic solvent to obtain the organic porous material,
where step (a) is carried out in the presence of at least one organic flame retardant as component (a4), where this flame retardant is soluble in the solvent.
The invention further relates to the porous materials thus obtainable, and also to the use of the porous materials for thermal insulation.

16 Claims, No Drawings

PROCESS FOR PRODUCING FLAME-RETARDANT POROUS MATERIALS BASED ON POLYUREA

This application is a Continuation of U.S. application Ser. No. 13/422,704, filed on Mar. 16, 2012, now pending.

The present invention relates to a process for producing flame-retardant porous materials comprising the following steps:

(a) reacting at least one polyfunctional isocyanate (a1) and at least one polyfunctional aromatic amine (a2) in an organic solvent optionally in the presence of water as component (a3) and optionally in the presence of at least one catalyst (a5); and then (b) removing the organic solvent to obtain the organic porous material, where step (a) is carried out in the presence of at least one organic flame retardant as component (a4), where this flame retardant is soluble in the solvent.

The invention further relates to the porous materials thus obtainable, and also to the use of the porous materials for thermal insulation.

On the basis of theoretical considerations, porous materials, such as polymer foams, with pores in the size range of a few micrometers or markedly less, and with high porosity of at least 70% are particularly good thermal insulators.

These porous materials with small average pore diameter can by way of example take the form of organic xerogels. The term xerogel is not used uniformly throughout the literature. The term xerogel generally means a porous material which has been produced via a sol-gel process, where the liquid phase has been removed from the gel via drying of the liquid phase below the critical temperature and below the critical pressure ("subcritical conditions"). In contrast to this, the term aerogels is generally used when the removal of the liquid phase from the gel takes place under supercritical conditions.

In the sol-gel process, a sol based on a reactive organic gel precursor is first produced, and then the sol is gelled via a crosslinking reaction to give a gel. In order to obtain a porous material, such as a xerogel, from the gel, the liquid has to be removed. The simplified term drying is used hereinafter to denote that step.

WO-2008/138978 discloses xerogels comprising from 30 to 90% by weight of at least one polyfunctional isocyanate and from 10 to 70% by weight of at least one polyfunctional aromatic amine, where the volume-average pore diameter of these is at most 5 micrometers.

However, the drying process in the processes known from the prior art, in particular the drying process under subcritical conditions, is attended by shrinkage, with porosity reduction and density increase.

Another problem with the formulations which are known from the prior art and are based on isocyanates and on amines is that the flame retardancy properties are inadequate for many applications.

It was therefore an object to avoid the abovementioned disadvantages. In particular, the intention was to provide a porous material which does not have the abovementioned disadvantages or has them to a reduced extent. The porous materials were intended to have advantageous thermal conductivity in vacuo. A further intention was that the porous materials also have low thermal conductivity at pressures above the vacuum range, in particular within a pressure range from about 1 mbar to about 100 mbar. This is desirable since a pressure increase occurs in vacuum panels over the course of time. A further intention was that the porous materials also have advantageous thermal conductivities in the aerated condition, i.e. at atmospheric pressure. A further intention was that the porous material simultaneously have high porosity, low density, and adequately high mechanical stability, together with advantageous flame retardancy properties.

The intention was to discover a process which gives porous organic materials with improved flame retardancy properties. At the same time, the intention was that the materials have an advantageous pore structure, so that abovementioned advantages are retained. The shrinkage occurring on removal of the solvent from the gel product obtained should be minimized, in particular when the solvent is removed under subcritical conditions.

The process of the invention and the porous materials thus obtainable were accordingly discovered.

The process of the invention for producing a porous material comprises the following steps:

(a) reacting at least one polyfunctional isocyanate (a1) and at least one polyfunctional aromatic amine (a2) in an organic solvent optionally in the presence of water as component (a3) and optionally in the presence of at least one catalyst (a5); and then (b) removing the organic solvent to obtain the organic porous material, where step (a) is carried out in the presence of at least one organic flame retardant as component (a4), where this flame retardant is soluble in the solvent.

An organic flame retardant is an organic compound which is at the same time a flame retardant. An organic compound is a compound which comprises at least one carbon atom.

A flame retardant is a compound or a mixture of a plurality of compounds which improves the flame retardancy properties of the resultant porous materials. For the purposes of the present invention, flame retardancy properties are characterized via the BKZ test. The term BKZ test means the determination of the fire index (combustibility class and fume class) as in "Wegleitung für Feuerpolizeivorschriften: Baustoffe and Bauteile" [Guidelines for Fire Authority Regulations: Construction Materials and Components], Part B: Prüfbestimmungen [Test Procedures], 1988 edition (with 1990, 1994, and 1995 addendums) of the Vereinigung Kantonaler Feuerversicherungen (VKF) [Association of Swiss Cantonal Fire Insurers]. A flame retardant is preferably characterized in that it leads to a combustibility class of 5 for the resultant porous materials in the BKZ test.

Preferred embodiments can be found in the claims and the description. Combinations of preferred embodiments are within the scope of this invention. Preferred embodiments of the components used are first explained below.

The polyfunctional isocyanates (a1) are hereinafter together termed component (a1). Correspondingly, the polyfunctional aromatic amines (a2) are hereinafter together termed component (a2). It is obvious to the person skilled in the art that the monomer components mentioned are present in reacted form in the porous material.

For the purposes of the present invention, the term functionality of a compound means the number of reactive groups per molecule. In the case of monomer component (a1), the functionality is the number of isocyanate groups per molecule. In the case of the amino groups of monomer component (a2), the term functionality means the number of reactive amino groups per molecule. The functionality of a polyfunctional compound here is at least 2.

If component (a1) and/or (a2) use(s) a mixture made of compounds having different functionality, the functionality of the components is the respective number average functionality of the individual compounds. A polyfunctional compound comprises at least two of the abovementioned functional groups per molecule.

Component (a1)

The process of the invention reacts at least one polyfunctional isocyanate as component (a1).

For the purposes of the process of the invention, the amount used of component (a1) is preferably at least 20% by weight, in particular at least 30% by weight, particularly preferably at least 40% by weight, very particularly preferably at least 55% by weight, in particular at least 68% by weight, based in each case on the total weight of components (a1) to (a4), which is 100% by weight. For the purposes of the process of the invention, the amount used of component (a1) is moreover preferably at most 99.8% by weight, in particular at most 99.3% by weight, particularly preferably at most 97.5% by weight, based in each case on the total weight of components (a1) to (a4), which is 100% by weight.

Polyfunctional isocyanates that can be used are aromatic, aliphatic, cycloaliphatic, and/or araliphatic isocyanates. These polyfunctional isocyanates are known per se or can be produced by methods known per se. The polyfunctional isocyanates can also in particular be used in the form of mixtures, in which case component (a1) therefore comprises various polyfunctional isocyanates. Polyfunctional isocyanates that can be used as monomer units (a1) have two or more than two isocyanate groups per molecule of monomer component (and in the first case are called diisocyanates).

Particularly suitable compounds are diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, diphenylethane 1,2-diisocyanate, and/or p-phenylene diisocyanate (PPDI), tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, and dicyclohexylmethane 4,4'-, 2,4'-, and/or 2,2'-diisocyanate.

Aromatic isocyanates are preferred polyfunctional isocyanates (a1). The following embodiments are particularly preferred as polyfunctional isocyanates of component (a1):
i) polyfunctional isocyanates based on tolylene diisocyanate (TDI), in particular 2,4-TDI or 2,6-TDI, or a mixture made of 2,4- and 2,6-TDI;
ii) polyfunctional isocyanates based on diphenylmethane diisocyanate (MDI), in particular 2,2'-MDI or 2,4'-MDI, or 4,4'-MDI, or oligomeric MDI, which is also termed polyphenyl polymethylene isocyanate, or a mixture made of two or three of the abovementioned diphenylmethane diisocyanates, or crude MDI, which is produced during the production of MDI, or a mixture made of at least one oligomer of MDI and at least one of the abovementioned low-molecular-weight MDI derivatives;
iii) a mixture made of at least one aromatic isocyanate as in embodiment i) and at least one aromatic isocyanate as in embodiment ii).

Oligomeric diphenylmethane diisocyanate is particularly preferred as polyfunctional isocyanate. Oligomeric diphenylmethane diisocyanate (hereinafter oligomeric MDI) is a mixture made of a plurality of oligomeric condensates and thus of derivatives of diphenylmethane diisocyanate (MDI).

The polyfunctional isocyanates can also preferably be composed of mixtures of monomeric aromatic diisocyanates and of oligomeric MDI.

Oligomeric MDI comprises one or more polynuclear condensates of MDI having functionality of more than 2, in particular 3 or 4, or 5. Oligomeric MDI is known and is often termed polyphenyl polymethylene isocyanate, or else polymeric MDI. Oligomeric MDI is usually composed of a mixture made of MDI-based isocyanates with varying functionality. Oligomeric MDI is usually used in a mixture with monomeric MDI.

The (average) functionality of an isocyanate which comprises oligomeric MDI can vary within the range from about 2.2 to about 5, in particular from 2.4 to 3.5, in particular from 2.5 to 3. One such mixture of MDI-based polyfunctional isocyanates having varying functionalities is in particular crude MDI, which is produced during the production as intermediate product in crude MDI production of MDI, usually catalyzed by hydrochloric acid.

Polyfunctional isocyanates or mixtures of a plurality of polyfunctional isocyanates based on MDI are known and are marketed by way of example as Lupranat® by BASF Polyurethanes GmbH.

The functionality of component (a1) is preferably at least two, in particular at least 2.2, and particularly preferably at least 2.4. The functionality of component (a1) is preferably from 2.2 to 4, and particularly preferably from 2.4 to 3.

The content of isocyanate groups in component (a1) is preferably from 5 to 10 mmol/g, in particular from 6 to 9 mmol/g, particularly preferably from 7 to 8.5 mmol/g. The person skilled in the art is aware of a reciprocal relationship between the content of isocyanate groups in mmol/g and the value known as equivalent weight in g/equivalent. The content of isocyanate groups in mmol/g is calculated from the content in % by weight as in ASTM D5155-96 A.

In one preferred embodiment, component (a1) is composed of at least one polyfunctional isocyanate selected from diphenylmethane 4,4'-diisocyanate, diphenylmethane 2,4'-diisocyanate, diphenylmethane 2,2'-diisocyanate, and oligomeric diphenylmethane diisocyanate. For the purposes of this preferred embodiment, component (a1) particularly preferably comprises oligomeric diphenylmethane diisocyanate, and its functionality is at least 2.5.

The viscosity of component (a1) used can vary widely. The viscosity of component (a1) is preferably from 100 to 3000 mPa·s, particularly preferably from 200 to 2500 mPa·s.

Component (a2)

Component (a2) in the invention is at least one polyfunctional aromatic amine.

Component (a2) can to some extent be produced in situ. In this type of embodiment, the reaction for the purposes of step (a) takes place in the presence of water (a3). Water reacts with the isocyanate groups to give amino groups with liberation of $CO_2$. Polyfunctional amines are thus to some extent produced as intermediate product (in situ). During a further course of the reaction, they are reacted with isocyanate groups to give urea linkages.

In this preferred embodiment, the reaction is carried out in the presence of water and of a polyfunctional aromatic amine as component (a2), and also optionally in the presence of a catalyst (a5).

In another embodiment, likewise preferred, the reaction of component (a1) and of a polyfunctional aromatic amine as component (a2) is optionally carried out in the presence of a catalyst (a5). No water (a3) is present here.

Polyfunctional aromatic amines are known per se to the person skilled in the art. The term polyfunctional amines means amines which, per molecule, have at least two amino groups reactive toward isocyanates. Groups reactive toward isocyanates here are primary and secondary amino groups, where the reactivity of the primary amino groups is generally markedly higher than that of the secondary amino groups.

The polyfunctional aromatic amines are preferably binuclear aromatic compounds having two primary amino groups (bifunctional aromatic amines), or corresponding tri- or polynuclear aromatic compounds having more than two primary amino groups, or a mixture made of the abovementioned compounds. Preferred polyfunctional aromatic amines of component (a2) are in particular isomers and derivatives of diaminodiphenylmethane.

The bifunctional binuclear aromatic amines mentioned are particularly preferably those of the general formula I,

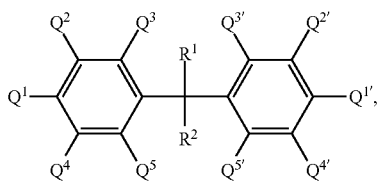

(I)

where $R^1$ and $R^2$ can be identical or different and are selected mutually independently from hydrogen and linear or branched alkyl groups having from 1 to 6 carbon atoms, and where all of the substituents $Q^1$ to $Q^5$ and $Q^{1'}$ to $Q^{5'}$ are identical or different and are selected mutually independently from hydrogen, a primary amino group, and a linear or branched alkyl group having from 1 to 12 carbon atoms, where the alkyl group can bear further functional groups, with the proviso that the compound of the general formula I comprises at least two primary amino groups, where at least one of $Q^{1'}$, $Q^{3'}$, and $Q^{5'}$ is a primary amino group, and at least one of $Q^{1'}$, $Q^{3'}$, and $Q^{5'}$ is a primary amino group.

In one embodiment, the alkyl groups for the purposes of the substituents Q of the general formula I are selected from methyl, ethyl, n-propyl, isopropyl, n-butyl, sec-butyl, and tert-butyl. Compounds of this type are hereinafter termed substituted aromatic amines (a2-s). However, it is likewise preferable that all of the substituents Q are hydrogen, to the extent that they are not amino groups as defined above (the term used being unsubstituted polyfunctional aromatic amines).

It is preferable that $R^1$ and $R^2$ for the purposes of the general formula I are identical or different and are selected mutually independently from hydrogen, a primary amino group, and a linear or branched alkyl group having from 1 to 6 carbon atoms. It is preferable that $R^1$ and $R^2$ are selected from hydrogen and methyl. It is particularly preferable that $R^1=R^2=H$.

Other suitable polyfunctional aromatic amines (a2) are in particular isomers and derivatives of toluenediamine. Particularly preferred isomers and derivatives of toluenediamine for the purposes of component (a2) are toluene-2,4-diamine and/or toluene-2,6-diamine, and diethyltoluenediamines, in particular 3,5-diethyltoluene-2,4-diamine and/or 3,5-diethyltoluene-2,6-diamine.

It is very particularly preferable that component (a2) comprises at least one polyfunctional aromatic amine selected from 4,4'-diaminodiphenylmethane, 2,4'-diaminodiphenylmethane, 2,2'-diaminodiphenylmethane, and oligomeric diaminodiphenylmethane.

Oligomeric diaminodiphenylmethane comprises one or more polynuclear methylene-bridged condensates of aniline and formaldehyde. Oligomeric MDA comprises at least one, but generally a plurality of, oligomers of MDA having functionality of more than 2, in particular 3 or 4, or 5. Oligomeric MDA is known or can be produced by methods known per se. Oligomeric MDA is usually used in the form of mixtures with monomeric MDA.

The (average) functionality of a polyfunctional amine of component (a2), where this amine comprises oligomeric MDA, can vary within the range from about 2.3 to about 5, in particular 2.3 to 3.5, and in particular from 2.3 to 3. One such mixture of MDA-based polyfunctional amines having varying functionalities is in particular crude MDA, which is produced in particular during the condensation of aniline with formaldehyde as intermediate product in production of crude MDI, usually catalyzed by hydrochloric acid.

It is particularly preferable that the at least one polyfunctional aromatic amine comprises diaminodiphenylmethane or a derivative of diaminodiphenylmethane. It is particularly preferable that the at least one polyfunctional aromatic amine comprises oligomeric diaminodiphenylmethane. It is particularly preferable that component (a2) comprises oligomeric diaminodiphenylmethane as compound (a2) and that its total functionality is at least 2.1. In particular, component (a2) comprises oligomeric diaminodiphenylmethane and its functionality is at least 2.4.

For the purposes of the present invention it is possible to control the reactivity of the primary amino groups by using substituted polyfunctional aromatic amines for the purposes of component (a2). The substituted polyfunctional aromatic amines mentioned, and stated below, hereinafter termed (a2-s), can be used alone or in a mixture with the abovementioned (unsubstituted) diaminodiphenylmethanes (where all Q in formula I are hydrogen, to the extent that they are not $NH_2$).

In this embodiment, $Q^2$, $Q^4$, $Q^{2'}$, and $Q^{4'}$ for the purposes of the formula I described above, inclusive of the attendant definitions, are preferably selected in such a way that the compound of the general formula I has at least one linear or branched alkyl group, where this can bear further functional groups, having from 1 to 12 carbon atoms in α-position with respect to at least one primary amino group bonded to the aromatic ring.

It is preferable that $Q^2$, $Q^4$, $Q^{2'}$, and $Q^{4'}$ in this embodiment are selected in such a way that the substituted aromatic amine (a2-s) comprises at least two primary amino groups which respectively have one or two linear or branched alkyl groups having from 1 to 12 carbon atoms in α-position, where these can bear further functional groups. To the extent that one or more of $Q^2$, $Q^4$, $Q^{2'}$, and $Q^{4'}$ are selected in such a way that they are linear or branched alkyl groups having from 1 to 12 carbon atoms, where these bear further functional groups, preference is then given to amino groups and/or hydroxy groups, and/or halogen atoms, as these functional groups.

It is preferable that the amines (a2-s) are selected from the group consisting of 3,3',5,5'-tetraalkyl-4,4'-diaminodiphenylmethane, 3,3',5,5'-tetraalkyl-2,2'-diaminodiphenylmethane, and 3,3',5,5'-tetraalkyl-2,4'-diaminodiphenylmethane, where the alkyl groups in 3,3',5 and 5' position can be identical or different and are selected mutually independently from linear or branched alkyl groups having from 1 to 12 carbon atoms, where these can bear further functional groups. Preference is given to abovementioned alkyl groups methyl, ethyl, n-propyl, isopropyl, n-butyl, sec-butyl or tert-butyl (in each case unsubstituted).

In one embodiment, one of, a plurality of, or all of, the hydrogen atoms of one or more alkyl groups of the substituents Q can have been replaced by halogen atoms, in particular chlorine. As an alternative, one of, a plurality of, or all of, the hydrogen atoms of one or more alkyl groups of the substituents Q can have been replaced by $NH_2$ or OH. However, it is preferable that the alkyl groups for the purposes of the general formula I are composed of carbon and hydrogen.

In one particularly preferred embodiment, component (a2-s) comprises 3,3',5,5'-tetraalkyl-4,4'-diaminodiphenylmethane, where the alkyl groups can be identical or different and are selected independently from linear or branched alkyl groups having from 1 to 12 carbon atoms, where these optionally can bear functional groups. Abovementioned alkyl groups are preferably selected from unsubstituted alkyl groups, in particular methyl, ethyl, n-propyl, isopropyl, n-butyl, sec-butyl, and tert-butyl, particularly preferably from methyl and ethyl. Very particular preference is given to 3,3',5,5'-tetraethyl-4,4'-diaminodiphenylmethane, and/or 3,3',5,5'-tetramethyl-4,4'-diaminodiphenylmethane.

The abovementioned polyfunctional amines of component (a2) are known per se to the person skilled in the art or can be produced by known methods. One of the known methods is the reaction of aniline or, respectively, of derivatives of aniline with formaldehyde, with acidic catalysis.

As explained above, water, as component (a3), can entirely or to some extent replace the polyfunctional aromatic amine, in that it reacts with an amount, which is then calculated in advance, of additional polyfunctional aromatic isocyanate of component (a1) in situ to give a corresponding polyfunctional aromatic amine. To the extent that water is used as component (a3), it is preferable to comply with particular parameters as stated hereinafter.

As previously stated, water reacts with the isocyanate groups to give amino groups, with liberation of $CO_2$. Polyfunctional amines are thus to some extent produced as intermediate product (in situ). During the further course of the reaction, they are reacted with isocyanate groups to give urea linkages. The $CO_2$ formed is not permitted to disrupt the gelling process to the extent that the structure of the resultant porous material is affected undesirably. This results in the preferred upper limit stated above for water content, based on the total weight of components (a1) to (a4), where this content is preferably at most 30% by weight, particularly preferably at most 25% by weight, in particular at most 20% by weight. Another advantage of water content within said range is that, after the gelling process, there is no need for any complicated drying process to remove any residual water.

To the extent that water is used as component (a3), the amount of water preferably used is from 0.1 to 30% by weight, in particular from 0.2 to 25% by weight, particularly preferably from 0.5 to 20% by weight, based in each case on the total weight of components (a1) to (a4), which is 100% by weight.

The preferred amount of water within the ranges described is dependent on whether a catalyst (a5) is used or not.

In a first variant, which comprises the use of water, the reaction of components (a1) and (a2) is carried out without the presence of a catalyst (a5). In this first embodiment it has proven advantageous to use from 5 to 30% by weight of water as component (a3), in particular from 6 to 25% by weight, particularly preferably from 8 to 20% by weight, based in each case on the total weight of components (a1) to (a4), which is 100% by weight.

For the purposes of this first embodiment, the ratio in which abovementioned components (a1) to (a3) are used is preferably as follows, in each case based on the total weight of components (a1) to (a3), which is 100% by weight: from 40 to 94.9% by weight of component (a1), in particular from 55 to 93.5% by weight, particularly preferably from 68 to 90% by weight, and from 0.1 to 30% by weight of polyfunctional aromatic amines (a2), in particular from 0.5 to 20% by weight, particularly preferably from 2 to 12% by weight, and from 5 to 30% by weight of water (a3), in particular from 6 to 25% by weight, particularly preferably from 8 to 20% by weight.

The water content and the content of reactive isocyanate groups in component (a1) gives a theoretical content of amino groups, on the assumption of complete reaction of the water with the isocyanate groups of component (a1) to form a corresponding amount of amino groups, where this content is added to the content resulting from component (a2) (total $n^{amine}$). The resultant usage ratio of the amount of NCO groups $n^{NCO}$ calculated as remaining, expressed as a ratio to the calculated number of amino groups formed, and also used, is hereinafter termed calculated usage ratio $n^{NCO}/n^{amine}$, and is an equivalence ratio, i.e. a molar ratio of the respective functional groups.

For the purposes of the abovementioned first variant, the calculated usage ratio (equivalence ratio) $n^{NCO}/n^{amine}$ can vary widely and in particular can be from 0.6 to 5. It is preferable that $n^{NCO}/n^{amine}$ is from 1 to 1.6, in particular from 1.1 to 1.4.

In a second, preferred variant, which comprises the use of water, the reaction of components (a1) to (a3) takes place in the presence of a catalyst (a5). In this second embodiment, it has proven advantageous to use from 0.1 to 15% by weight of water (a3), in particular from 0.2 to 15% by weight, particularly preferably from 0.5 to 12% by weight, based in each case on the total weight of components (a1) to (a3), which is 100% by weight. Within the abovementioned ranges, particularly advantageous mechanical properties of the resultant porous materials are obtained, and this results from a particularly advantageous network structure. A larger amount of water has an adverse effect on the network structure and is disadvantageous with regard to the final properties of the porous material.

For the purposes of the preferred second variant, the ratio in which abovementioned components (a1) to (a3) are used is preferably as follows, in each case based on the total weight of components (a1) to (a3), which is 100% by weight: from 55 to 99.8% by weight of component (a1), in particular from 65 to 99.3% by weight, particularly preferably from 76 to 97.5% by weight, and from 0.1 to 30% by weight of polyfunctional aromatic amine (a2), in particular from 0.5 to 20% by weight, particularly preferably from 2 to 12% by weight, and from 0.1 to 15% by weight of water (a3), in particular from 0.2 to 15% by weight, particularly preferably from 0.5 to 12% by weight.

In the abovementioned second variant, the calculated usage ratio (equivalence ratio) $n^{NCO}/n^{amine}$ is preferably from 1.01 to 5. The equivalence ratio mentioned is particularly preferably from 1.1 to 3, in particular from 1.1 to 2. In this embodiment, an excess of $n^{NCO}$ with respect to $n^{amine}$ leads to less shrinkage of the porous material, in particular xerogel, on removal of the solvent, and also, via synergistic action together with the catalyst (a5), to an improved network structure and improved final properties of the resultant porous material.

In another second preferred embodiment, explained previously, the reaction of step (a) takes place in the absence of water. For the purposes of this preferred embodiment, the ratio used of components (a1) and (a2) stated above is preferably as follows, based in each case on the total weight of components (a1) and (a2), which is 100% by weight: from 20 to 80% by weight of component (a1), in particular from 25 to 75% by weight, particularly preferably from 35 to 68% by weight, and from 20 to 80% by weight of component (a2), in particular from 25 to 75% by weight, particularly preferably from 32 to 65% by weight; no (a3).

For the purposes of this embodiment stated above, the usage ratio (equivalence ratio) $n^{NCO}/n^{amine}$ is preferably from 1.01 to 5. The equivalence ratio mentioned is particularly preferably from 1.1 to 3, in particular from 1.1 to 2. Again, in this embodiment, an excess of $n^{NCO}$ with respect to $n^{amine}$ leads to less shrinkage of the porous material, in particular xerogel, on removal of the solvent, and also, via synergistic action together with the catalyst (a5), to an improved network structure and improved final properties of the resultant porous material.

The term organic gel precursors (A) is used hereinafter to cover components (a1) to (a3).

Component (a4)

The reaction of components (a1) and (a2) in the invention is carried out in the presence of at least one organic flame retardant as component (a4).

It is preferable that the flame retardants of component (a4) are compounds comprising phosphorus and/or halogen, in particular bromine. However, it is also possible to use flame retardants based on boron.

Preferred amounts used of component (a4) are from 0.1 to 25% by weight, preferably from 1 to 15% by weight, based in each case on the total weight of component (a1) to (a4), which is 100% by weight. This range gives firstly particularly good flame retardancy properties and secondly an advantageous pore structure. The preferred ranges mentioned apply to all of the embodiments stated at an earlier stage above in relation to components (a1) to (a3).

It is preferable that component (a4) comprises at least one flame retardant which is selected from the group consisting of polybrominated compounds and organophosphorus compounds.

Polybrominated compounds are any of the compounds which comprise at least two bromine atoms per molecule. Preferred polybrominated compounds are in particular: pentabromotoluene, pentabromophenyl allyl ether, pentabromoethyl benzene, decabromobiphenyl, pentabromodiphenyl oxide, octabromodiphenyl oxide, decabromodiphenyl oxide, ethylenebis(tetrabromophthalimide), tetradecabromodiphenoxybenzene, ester-ethers of tetrabromophthalic anhydride, and tetrabromoneopentyl glycol, and its derivatives.

Organophosphorus compounds are compounds which comprise at least one phosphorus atom and at least one carbon atom, in particular organic phosphates, phosphonates, phosphinates, phosphites, phosphonites, phosphinites, and phosphine oxides.

Organophosphorus compounds preferred for the purposes of the present invention are in particular those having a P=O double bond, in particular organophosphates, organophosphonates, and organophosphine oxides. The prefix organo here characterizes the presence of an organic compound in the abovementioned sense, and is not restricted to the presence of a C—P bond.

The term organophosphate means organic compounds in which the P—OH groups of phosphoric acid have been replaced by P—OR, where each R can be identical or different and is mutually independently an organic moiety, in particular a hydrocarbon group, which can be aliphatic, araliphatic, or aromatic, and which can comprise further functional groups.

The term organophosphonate means organic compounds in which the P—OH groups of phosphonic acid have been replaced by P—OR and the P—H groups have been replaced by P—R, where each R can be identical or different and is mutually independently an organic moiety, in particular a hydrocarbon group, which can be aliphatic, araliphatic, or aromatic, and which can comprise further functional groups.

The term organophosphine oxide means organic compounds of the structure $R_3P=O$, where each R can be identical or different and is mutually independently an organic moiety, in particular a hydrocarbon group, which can be aliphatic, araliphatic, or aromatic, and which can comprise further functional groups.

In one first preferred embodiment, component (a4) comprises at least one organophosphate. Preferred organophosphoric acid derivatives are those of the structure $OP(OR)_3$, where each R is mutually independently an aliphatic, araliphatic, or aromatic hydrocarbon group having from 1 to 20 carbon atoms, where this group can bear further functional groups, examples being ether linkages, halogen atoms, and also groups reactive toward isocyanates, in particular OH groups and/or $NH_2$ groups.

Preferred organophosphates are in particular triaryl and trialkyl phosphates, e.g. diphenyl cresyl phosphate, tricresyl phosphate, triethyl phosphate, 2-ethylhexyl diphenyl phosphate, and the tetraphenyl ester of phenylene 1,3-phosphate, and also tris(2-chloropropyl) phosphate.

In another preferred embodiment, component (a4) comprises at least one organophosphonate.

Preferred organophosphonates are those of the structure $RPO(OR)_2$, where each R is mutually independently an aliphatic, araliphatic, or aromatic hydrocarbon group having from 1 to 20 carbon atoms, where this group can bear further functional groups, examples being ether linkages, halogen atoms, and also groups reactive toward isocyanates, in particular OH groups and/or $NH_2$ groups.

Preferred organophosphonates are in particular triaryl and trialkyl phosphonates, diethyl N,N-bis(2-hydroxyethyl)aminomethylphosphonate, tetraalkyl diphosphonate compounds, dimethyl methanephosphonate, diethyl ethanephosphonate, and the like, and also phosphorus polyols and alkoxylated alkyl phosphonic acid derivatives.

In another preferred embodiment, component (a4) comprises at least one organophosphinic acid derivative.

Preferred organophosphine oxides are those of the structure $OPR_3$, where each R is mutually independently an aliphatic, araliphatic, or aromatic hydrocarbon group having from 1 to 20 carbon atoms, where this group can bear further functional groups, examples being ether linkages, halogen atoms, and also groups reactive toward isocyanates, in particular OH groups and/or $NH_2$ groups. Preferred organophosphine oxides are in particular bis(hydroxymethyl)isobutylphosphine oxide, bis(3-hydroxypropyl)isobutylphosphine oxide, triethylphosphine oxide, dimethyldecylphosphine oxide, tributylphosphine oxide, tris(2-ethylhexyl)phosphine oxide, methyldiphenylphosphine oxide, trioctylphosphine oxide, triphenylphosphine oxide, and tris(2-methylphenyl) phosphine oxide.

Abovementioned flame retardants can be used individually or in the form of a combination of two or more of the abovementioned compounds.

As stated at an earlier stage above, the flame retardants can comprise one or more functional groups.

In one embodiment, it is preferable that component (a4) comprises at least one compound which comprises a functional group reactive toward isocyanates, in particular at least 2 such reactive functional groups. Preferred reactive groups are OH and primary and secondary amino groups. Primary and secondary amino groups are reactive with respect to component (a1) of the present invention and are thus incorporated into the resultant network structure. Although OH groups are also reactive toward isocyanates, this is true only to a relatively small extent, and any amines present are therefore reacted first. The reactivity of the OH groups can be increased via use of a suitable catalyst (a5) which accelerates the urethane-formation reaction.

Particularly preferred flame retardants are as follows: tris(2-chloro-1-methylethyl) phosphate, diethyl ethylphosphonate, dimethyl propylphosphonate, tri(isopropylphenyl) phosphate (Reofos 95), oligomeric chloroalkyl phosphates (Fyrol 99), resorcinol bis(diphenyl phosphates), 2-(2-hydroxyethoxy)ethyl 2-hydroxypropyl 3,4,5,6-tetrabromophthalate, bis(hydroxymethyl)isobutylphosphine oxide, bis(3-hydroxypropyl)isobutylphosphine oxide, and trioctylphosphine oxide.

Catalyst (a5)

In one first preferred embodiment, the process of the invention is preferably carried out in the presence of at least one catalyst as component (a5).

Catalysts that can be used are in principle any of the catalysts which are known to the person skilled in the art and which accelerate the trimerization of isocyanates (these being known as trimerizaton catalysts) and/or accelerate the reaction of isocyanates with amino groups or OH groups (these being known as gel catalysts), and/or—to the extent that a component (a3), i.e. water, is used—accelerate the reaction of isocyanates with water (these being known as blowing catalysts).

The corresponding catalysts are known per se, and perform in different ways in respect of the abovementioned three reactions. They can thus be allocated to one or more of the abovementioned types according to performance. The person skilled in the art is moreover aware that reactions other than the abovementioned reactions can also occur.

Corresponding catalysts can be characterized inter alia on the basis of their gel to blowing ratio, as is known by way of example from Polyurethane [Polyurethanes], 3rd edition, G. Oertel, Hanser Verlag, Munich, 1993, pp. 104 to 110.

To the extent that no component (a3), i.e. no water, is used, preferred catalysts have significant activity with regard to the trimerization process. This has an advantageous effect on the homogeneity of the network structure, resulting in particularly advantageous mechanical properties. To the extent that reactive (incorporatable) catalysts are used, preferred catalysts also have significant activity in respect of catalyzation of the urethane-formation reaction (gel reaction).

To the extent that water (a3) is used, preferred catalysts (a5) have a balanced gel to blowing ratio, so that the reaction of component (a1) with water is not excessively accelerated, adversely affecting the network structure, with a simultaneous short gelling time, so that demolding time is advantageously small. Preferred catalysts simultaneously have significant activity with regard to the trimerization process. This has an advantageous effect on the homogeneity of the network structure, giving particularly advantageous mechanical properties.

The catalysts can be a monomer unit (incorporatable catalysts) or can be non-incorporatable.

It is advantageous to use the smallest effective amount of component (a5). It is preferable to use amounts of from 0.01 to 5 parts by weight, in particular from 0.1 to 3 parts by weight, particularly preferably from 0.2 to 2.5 parts by weight, of component (a5), based on a total of 100 parts by weight of components (a1) to (a4).

Catalysts preferred for the purposes of component (a5) are selected from the group consisting of primary, secondary, and tertiary amines, triazine derivatives, organometallic compounds, metal chelates, quaternary ammonium salts, ammonium hydroxides, and also the hydroxides, alkoxides, and carboxylates of alkali metals and of alkaline earth metals.

Suitable catalysts are in particular strong bases, for example quaternary ammonium hydroxides, e.g. tetraalkylammonium hydroxides having from 1 to 4 carbon atoms in the alkyl moiety and benzyltrimethylammonium hydroxide, alkali metal hydroxides, e.g. potassium hydroxide or sodium hydroxide, and alkali metal alkoxides, e.g. sodium methoxide, potassium ethoxide and sodium ethoxide, and potassium isopropoxide.

Other suitable catalysts are in particular alkali metal salts of carboxylic acids, e.g. potassium formate, sodium acetate, potassium acetate, potassium 2-ethylhexanoate, potassium adipate, and sodium benzoate, and alkali metal salts of long-chain fatty acids having from 8 to 20, in particular from 10 to 20, carbon atoms and optionally having pendant OH groups.

Other suitable catalysts are in particular N-hydroxyalkyl quaternary ammonium carboxylates, e.g. trimethylhydroxypropylammonium formate.

Organometallic compounds are known per se to the person skilled in the art, in particular in the form of gel catalysts, and are likewise suitable catalysts (a5). Organotin compounds, e.g. tin 2-ethylhexanoates and dibutyltin dilaurates, are preferred for the purposes of component (a5).

Tertiary amines are known per se to the person skilled in the art as gel catalysts and as trimerization catalysts. Tertiary amines are particularly preferred as catalysts (a5). Preferred tertiary amines are in particular N,N-dimethylbenzylamine, N,N'-dimethylpiperazine, N,N-dimethylcyclohexylamine, N,N',N''-tris(dialkylaminoalkyl)-s-hexahydrotriazines, e.g. N,N',N''-tris(dimethylaminopropyl)-s-hexahydrotriazine, tris(dimethylaminomethyl)phenol, bis(2-dimethylaminoethyl)ether, N,N,N,N,N-pentamethyldiethylenetriamine, methylimidazole, 1,2-dimethylimidazole, dimethylbenzylamine, 1,6-diazabicyclo[5.4.0]undec-7-ene, triethylamine, triethylenediamine (IUPAC: 1,4-diazabicyclo[2,2,2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, and diisopropanolamine.

Catalysts particularly preferred for the purposes of component (a5) are selected from the group consisting of N,N-dimethylcyclohexylamine, bis(2-dimethylaminoethyl)ether, N,N,N,N,N-pentamethyldiethylenetriamine, methylimidazole, 1,2-dimethylimidazole, dimethylbenzylamine, 1,6-diazabicyclo[5.4.0]undec-7-ene, trisdimethylaminopropylhexahydrotriazine, triethylamine, tris(dimethylaminomethyl)phenol, triethylenediamine (diazabicyclo[2,2,2]octane), dimethylaminoethanolamine, dimethylaminopropylamine, N,N-dimethylaminoethoxyethanol, N,N,N-trimethylaminoethylethanolamine, triethanolamine, diethanolamine, triisopropanolamine, diisopropanolamine, metal acetylacetonates, ammonium ethylhexanoates, and ethylhexanoates of metal ions.

The use of the catalysts (a5) preferred for the purposes of the present invention leads to porous materials with improved mechanical properties, in particular to improved compressive strength. Use of the catalysts (a5) moreover reduces the gelling time, i.e. accelerates the gelling reaction, without any adverse effect on other properties.

Solvent

The reaction in the present invention takes place in the presence of a solvent.

For the purposes of the present invention, the term solvent comprises liquid diluents, i.e. not only solvents in the narrower sense but also dispersion media. The mixture can in particular be a genuine solution, a colloidal solution, or a dispersion, e.g. an emulsion or suspension. It is preferable that the mixture is a genuine solution. The solvent is a compound that is liquid under the conditions of the step (a), preferably an organic solvent.

Solvent used can in principle comprise an organic compound or a mixture of a plurality of compounds, where the solvent is liquid under the temperature conditions and pressure conditions under which the mixture is provided in step (a) (abbreviated to: solution conditions). The constitution of the solvent is selected in such a way that the solvent is capable of dissolving or dispersing, preferably dissolving, the organic gel precursor. Preferred solvents are those which are a solvent for the organic gel precursor (A), i.e. those which dissolve the organic gel precursor (A) completely under reaction conditions.

The initial reaction product of the reaction in the presence of the solvent is a gel, i.e. a viscoelastic chemical network swollen by the solvent. A solvent which is a good swelling agent for the network formed in step (a) generally leads to a network with fine pores and with small average pore diameter, whereas a solvent which is a poor swelling agent for the gel resulting from step (a) generally leads to a coarse-pored network with large average pore diameter.

The selection of the solvent therefore affects the desired pore size distribution and the desired porosity. The selection of the solvent is generally also carried out in such a way as very substantially to avoid precipitation or flocculation due to formation of a precipitated reaction product during or after step (a) of the process of the invention.

When a suitable solvent is selected, the proportion of precipitated reaction product is usually smaller than 1% by weight, based on the total weight of the mixture. The amount of precipitated product formed in a particular solvent can be determined gravimetrically, by filtering the reaction mixture through a suitable filter prior to the gel point.

Solvents that can be used are the solvents known from the prior art for isocyanate-based polymers. Preferred solvents here are those which are a solvent for components (a1) to (a5), i.e. those which substantially completely dissolve the constituents of components (a1) to (a5) under reaction conditions. It is preferable that the solvent is inert, i.e. not reactive, toward component (a1).

Examples of solvents that can be used are ketones, aldehydes, alkyl alkanoates, amides, such as formamide and N-methylpyrrolidone, sulfoxides, such as dimethyl sulfoxide, aliphatic and cycloaliphatic halogenated hydrocarbons, halogenated aromatic compounds, and fluorine-containing ethers. It is also possible to use mixtures made of two or more of the abovementioned compounds.

Acetals can also be used as solvents, in particular diethoxymethane, dimethoxymethane, and 1,3-dioxolane.

Dialkyl ethers and cyclic ethers are also suitable as solvent. Preferred dialkyl ethers are in particular those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl tert-butyl ether, ethyl-n-butyl ether, ethyl isobutyl ether, and ethyl tert-butyl ether. Particularly preferred cyclic ethers are tetrahydrofuran, dioxane, and tetrahydropyran.

Other preferred solvents are alkyl alkanoates, in particular methyl formate, methyl acetate, ethyl formate, butyl acetate, and ethyl acetate. Preferred halogenated solvents are described in WO 00/24799, page 4, line 12 to page 5, line 4.

Aldehydes and/or ketones are preferred solvents. Aldehydes or ketones suitable as solvents are particularly those corresponding to the general formula $R^2$—(CO)—$R^1$, where $R^1$ and $R^2$ are hydrogen or alkyl groups having 1, 2, 3 or 4 carbon atoms. Suitable aldehydes or ketones are in particular acetaldehyde, propionaldehyde, n-butyraldehyde, isobutyraldehyde, 2-ethylbutyraldehyde, valeraldehyde, isopentaldehyde, 2-methylpentaldehyde, 2-ethylhexyldehydes, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanacetaldehyde, ethyl glyoxylate, benzaldehyde, acetone, diethyl ketone, methyl ethyl ketone, methyl isobutyl ketone, methyl n-butyl ketone, ethyl isopropyl ketone, 2-acetylfuran, 2-methoxy-4-methylpentan-2-one, cyclohexanone, and acetophenone. The abovementioned aldehydes and ketones can also be used in the form of mixtures. Particular preference is given, as solvents, to ketones and aldehydes having alkyl groups having up to 3 carbon atoms per substituent. Ketones of the general formula $R^1(CO)R^2$ are very particularly preferred, where $R^1$ and $R^2$ are mutually independently selected from alkyl groups having from 1 to 3 carbon atoms. In one first preferred embodiment, the ketone is acetone. In another preferred embodiment, at least one of the two substituents $R^1$ and/or $R^2$ comprises an alkyl group having at least 2 carbon atoms, in particular methyl ethyl ketone. Use of the abovementioned particularly preferred ketones in combination with the process of the invention gives porous materials with particularly small average pore diameter. Without any intention of restriction, it is believed that the pore structure of the resultant gel is particularly fine because of the relatively high affinity of the abovementioned particularly preferred ketones.

In many instances, particularly suitable solvents are obtained by using two or more compounds which are selected from the abovementioned solvents and which are completely miscible with one another.

In order, in step (a), to obtain an adequately stable gel which does not shrink markedly during the drying process in step (b), the proportion of components (a1) to (a4), based on the total weight of components (a1) to (a4) and on the solvent, which is 100% by weight, is generally not permitted to be less than 5% by weight. It is preferable that the proportion of components (a1) to (a4), based on the total weight of components (a1) to (a4) and on the solvent, which is 100% by weight, is at least 6% by weight, particularly preferably at least 8% by weight, in particular at least 10% by weight.

On the other hand, selection of an excessively high concentration of components (a1) to (a4) in the mixture provided is not permitted, since otherwise the product is not a porous material with advantageous properties. The proportion of components (a1) to (a4), based on the total weight of components (a1) to (a4) and on the solvent, which is 100% by weight, is generally at most 40% by weight. It is preferable that the proportion of components (a1) to (a4), based on the total weight of components (a1) to (a4) and on the solvent, which is 100% by weight, is at most 35% by weight, particularly at most 25% by weight, in particular at most 20% by weight.

It is preferable that the proportion by weight of components (a1) to (a4), based on the total weight of components (a1) to (a4) and on the solvent, which is 100% by weight, is in total from 8 to 25% by weight, in particular from 10 to 20% by weight, with particular preference from 12 to 18% by weight. If the amount of the starting materials is maintained within the range mentioned, porous materials are obtained with particularly advantageous pore structure, and with low thermal conductivity and low shrinkage during the drying process.

It is preferable that the reaction in step (a) of the process of the invention is preceded by the provision of components (a1), (a2), optionally (a3), optionally (a5), and also (a3), and of the solvent.

It is preferable to provide, separately from one another, components (a1) on the one hand and (a2) and (a4), and also optionally (a3) and optionally (a5) on the other hand, respectively in a suitable portion of the solvent. Separate provision permits ideal monitoring and/or control of the gelling reaction prior to and during the mixing process.

To the extent that water is used as component (a3), it is particularly preferable to provide component (a3) separately from component (a1). This avoids reaction of water with component (a1) with formation of networks without the presence of component (a2). Otherwise, the premixing of water with component (a1) leads to less advantageous properties in relation to the homogeneity of pore structure and to the thermal conductivity of the resultant materials.

The mixture or mixtures provided prior to conduct of step (a) can moreover comprise conventional auxiliaries known to the person skilled in the art, as further constituents. Examples that may be mentioned are surfactant substances, nucleating agents, antioxidants, lubricants and mold-release aids, dyes and pigments, stabilizers, e.g. to counteract the effects of hydrolysis, light, heat, or discoloration, inorganic and/or organic fillers, reinforcing agents, and biocides.

Further details concerning the abovementioned auxiliaries and additives can be found in the technical literature, e.g. in Plastics Additive Handbook, 5th edition, H. Zweifel, ed. Hanser Publishers, Munich, 2001, pp. 104-127.

In order to carry out the reaction in step (a) of the process of the invention, it is first necessary to produce a homogeneous mixture of the components that are provided prior to the reaction in step (a).

The method of provision of the components reacted for the purposes of step (a) can be conventional. To this end, it is preferable to use a stirrer or other mixing apparatus in order to achieve good and rapid mixing. In order to avoid defects in the mixing process, the time needed to produce the homogeneous mixture should be small in relation to the time required for the at least partial formation of a gel by the gelling reaction. The other mixing conditions are generally not critical, and by way of example the mixing process can take place at from 0 to 100° C. and at from 0.1 to 10 bar (absolute), in particular by way of example at room temperature and atmospheric pressure. Once production of a homogeneous mixture has been achieved, the mixing apparatus is preferably switched off.

The gelling reaction involves a polyaddition reaction, in particular a polyaddition process involving isocyanate groups and amino groups.

The term gel means a crosslinked system based on a polymer which is in contact with a liquid (a term used being solvogel or lyogel, or, with water as liquid, aquagel or hydrogel). The polymer phase here forms a continuous three-dimensional network.

For the purposes of step (a) of the process of the invention, the gel is usually produced by allowing the material to stand, e.g. simply allowing the container, reaction vessel, or reactor within which the mixture is present (hereinafter termed gelling apparatus) to stand. It is preferable that the mixture is not subjected to further stirring or mixing during the gelling process (gel formation process), since this could inhibit formation of the gel. It has proven advantageous to cover the mixture during the gelling process or to seal the gelling apparatus.

The gelling process is known per se to the person skilled in the art and is described by way of example in WO-2009/027310, page 21, line 19-page 23, line 13.

Step (b)

In step (b) in the invention, the gel obtained in the previous step is dried, by removing the organic solvent to give the organic porous material.

In principle it is possible to use a drying process under supercritical conditions, preferably after replacement of the solvent by $CO_2$ or by other solvents suitable for supercritical drying purposes. This type of drying process is known per se to the person skilled in the art. Supercritical conditions characterize a temperature and a pressure at which the fluid phase to be removed is in the supercritical state. This method can reduce the shrinkage of the gel product during removal of the solvent. The material obtained from the supercritical drying process is termed aerogel.

However, for simple conduct of the process it is preferable to dry the gels by converting the liquid comprised within the gel to the gaseous state at a temperature and a pressure below the critical temperature and the critical pressure of the liquid comprised within the gel. The material obtained from the subcritical drying process is termed xerogel.

It is preferable that the gel is dried by converting the solvent to the gaseous state at a temperature and a pressure below the critical temperature and the critical pressure of the solvent. There is accordingly preferably no prior replacement by another solvent before the drying process removes the solvent that was present during the reaction.

Appropriate methods are likewise known to the person skilled in the art and are described in WO-2009/027310, page 26, line 22-page 28, line 36.

Shrinkage of the gel product is particularly apparent in the subcritical drying process. Minimization of shrinkage during the drying process is an advantage of the present invention.

Properties of the Porous Materials and Use

The present invention further provides the porous materials obtainable in the process of the invention.

Xerogels are preferred as porous materials for the purposes of the present invention, and this means that the porous material obtainable in the invention is preferably a xerogel.

For the purposes of the present invention, a xerogel is in particular a porous material with porosity of at least 70% by volume and with volume-average pore diameter of at most 50 micrometers, produced via a sol-gel process, where the liquid phase has been removed from the gel via drying below the critical temperature and below the critical pressure of the liquid phase ("subcritical conditions").

For the purposes of the present invention, average pore size is preferably determined by means of mercury porosimetry to DIN 66133 (1993) at room temperature. For the purposes of this invention, average pore size is equivalent to average pore diameter. Volume-average pore diameter is determined here by calculation from the pore size distribution determined to the abovementioned standard.

The volume-average pore diameter of the porous material is preferably at most 8 micrometers. The volume-average pore diameter of the porous material is particularly preferably at most 5 micrometers, very particularly preferably at most 3 micrometers, and in particular at most 1 micrometer.

Although minimum pore size, with high porosity, is desirable in order to give low thermal conductivity, there is a practical lower limit for volume-average pore diameter resulting from the production process and from the need to obtain a porous material with adequate mechanical stability. The volume-average pore diameter is generally at least 50 nm, preferably at least 100 nm. In many instances, volume-average pore diameter is at least 200 nm, in particular at least 300 nm.

The porosity of the porous material obtainable in the invention is preferably at least 70% by volume, in particular from 70 to 99% by volume, particularly preferably at least 80% by volume, very particularly preferably at least 85% by volume, in particular from 85 to 95% by volume. Porosity in % by volume means that the specified proportion of the total volume of porous material is composed of pores. Although maximum porosity is mostly desirable in order to obtain minimum thermal conductivity, mechanical properties, and the processability of the porous material, place an upper limit on porosity.

Components (a1), optionally to some extent first reacted with water, and (a2) are in reacted (polymeric) form in the porous material obtainable in the invention. By virtue of the composition of the invention, the monomer units (a1) and (a2) are predominantly present in a form bonded by way of urea linkages and/or by way of isocyanurate linkages within the porous material, and the isocyanurate groups here are produced via trimerization of isocyanate groups of the monomer units (a1). To the extent that the porous material comprises further components, other possible linkages are by way of example urethane groups, where these are produced via reaction of isocyanate groups with alcohols or with phenols.

It is preferable that, within the porous material, components (a1), optionally to some extent first reacted with water, and (a2) are present in a form which to an extent of at least 50 mol % has been linked via urea groups —NH—CO—NH— and/or by way of isocyanurate linkages. It is preferable that, within the porous material, components (a1) and (a2) are present in a form linked to an extent of from 50 to 100 mol % via urea groups and/or by way of isocyanurate linkages, in particular to an extent of from 60 to 100 mol %, very particularly preferably to an extent of from 70 to 100 mol %, in particular to an extent of from 80 to 100 mol %, for example to an extent of from 90 to 100 mol %.

The balancing mol % value required to give 100 mol % represents other linkages, and these other linkages are known per se to the person skilled in the art in the field of isocyanate polymers. Examples that may be mentioned are ester groups, urea groups, biuret groups, allophanate groups, carbodiimide groups, uretdione groups and/or urethane groups.

The mol % values for the linkages of the monomer units within the porous material are determined by means of NMR spectroscopy (nuclear spin resonance) in the solid state or in the swollen state. Suitable methods of determination are known to the person skilled in the art.

The density of the porous material obtainable in the invention is usually from 20 to 600 g/l, preferably from 50 to 500 g/l, and particularly preferably from 70 to 200 g/l.

The process of the invention gives a coherent porous material, and not merely a polymer powder or polymer particles. The three-dimensional shape of the resultant porous material here is determined via the shape of the gel, and this shape is in turn determined via the shape of the gelling apparatus. By way of example, therefore, a cylindrical gel container usually gives an approximately cylindrical gel, which can then be dried to give a porous material in the shape of a cylinder.

The porous materials obtainable in the invention have low thermal conductivity, high porosity, and low density, together with high mechanical stability, and also good flame retardancy properties. The porous materials moreover have low average pore size. The combination of the abovementioned properties permits use as insulation material in the thermal insulation sector, in particular for applications in the vacuum sector, where preference is given to minimum thickness of vacuum panels, for example in refrigeration equipment or in buildings. Preference is therefore given to the use in vacuum insulation panels, in particular as core material for vacuum insulation panels. Preference is also given to the use of the porous materials of the invention for thermal insulation, in particular in construction applications. The materials obtainable via the present invention feature firstly advantageous thermal conductivities and secondly advantageous flame retardancy properties. The advantageous thermal insulation properties at atmospheric pressure together with the good flame retardancy properties make the materials of the invention particularly suitable for construction applications.

EXAMPLES

Pore volume in ml per g of sample and average pore size of the materials were determined by means of mercury porosimetry to DIN 66133 (1993) at room temperature. For the purposes of this invention, average pore size is equivalent to average pore diameter. Volume-average pore diameter is determined here by calculation from the pore size distribution determined to the abovementioned standard.

Porosity in % by volume was calculated from the formula $P=(V_i/(V_i+V_s))*100\%$ by volume, where P is the porosity, $V_i$ is the Hg intrusion volume to DIN 66133 in ml/g, and $V_s$ is the specific volume in ml/g of the test specimen.

Density ρ of the porous gel in g/ml was calculated from the formula $\rho=m/(\pi*r^2)*h$, where m is the mass of the porous gel, r is the radius (half diameter) of the porous gel, and h is the height of porous gel.

Shrinkage during step (b) of the process of the invention was determined by comparing the height of a cylindrical gel and the diameter in cm prior to and after removal of the solvent. The values stated are based on the relative volume of the cylinder after shrinkage in comparison with the gel product prior to removal of the solvent, and this means that shrinkage is stated as % loss of volume. Prior to shrinkage, the height of the cylinders was 4.9 cm and the diameter of the cylinders was 2.7 cm.

Flame retardancy properties were determined by the BKZ test as described above. To the extent that the maximum flame height stated for the purposes of combustibility class 5, 15 cm, was not achieved, the flame height observed in the BKZ test has instead been stated.

The following compounds were used:
Component a1:
Oligomeric MDI (Lupranat® M50) having NCO content of 31.5 g per 100 g to ASTM D5155-96 A, functionality in the range from 2.8 to 2.9, and viscosity of 550 mPa·s at 25° C. to DIN 53018 (hereinafter "compound M50").

Component a2:

Oligomeric diaminodiphenylmethane with viscosity of 2710 mPa·s at 50° C. to DIN 53018, functionality in the region of 2.4, and amino group content of 9.93 mmol/g (hereinafter "PMDA").

Component a3:

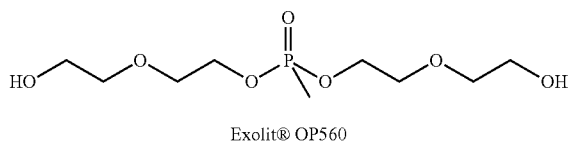 [SMILES: CP(=O)(OCCOCCO)OCCOCCO]

Exolit® OP560

PHT-4-Diol™ from Chemtura:

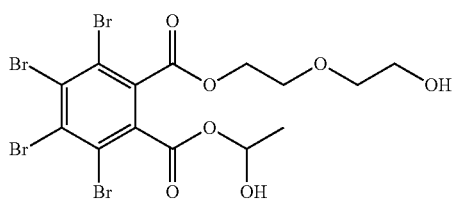 [SMILES: CC(O)OC(=O)c1c(Br)c(Br)c(Br)c(Br)c1C(=O)OCCOCCO]

Antiblaze® V490 from Albemarle:

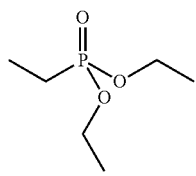

Example 1

2.0 g of compound M50 were dissolved in 10.5 g of acetone in a glass beaker at 20° C., with stirring. 1.3 g of PMDA and 0.5 g of Exolit® OP560 were dissolved in 11 g of acetone in a second glass beaker. The two solutions of step (a) were mixed. This gave a clear mixture of low viscosity. The mixture was allowed to stand at room temperature for 24 hours for hardening. The gel was then removed from the glass beaker, and the liquid (acetone) was removed by drying at 20° C. for 7 days.

The average pore diameter of the resultant material was 4.0 μm. Porosity was 86% by volume, with corresponding density of 233 g/l. Shrinkage was 42%. The flame height measured in the BKZ test was 5 cm.

Example 2

2.0 g of compound M50 were dissolved in 10.5 g of acetone in a glass beaker at 20° C., with stirring. 1.3 g of PMDA and 0.5 g of PHT-4-Diol™ were dissolved in 11 g of acetone in a second glass beaker. The two solutions of step (a) were mixed. This gave a clear mixture of low viscosity. The mixture was allowed to stand at room temperature for 24 hours for hardening. The gel was then removed from the glass beaker, and the liquid (acetone) was removed by drying at 20° C. for 7 days.

The average pore diameter of the resultant material was 5.0 μm. Porosity was 85% by volume, with corresponding density of 235 g/l. Shrinkage was 43%. The flame height measured in the BKZ test was 9 cm.

Example 3

2.0 g of compound M50 were dissolved in 10.5 g of acetone in a glass beaker at 20° C., with stirring. 1.3 g of PMDA and 0.5 g of Antiblaze® V490 from Albemarle were dissolved in 11 g of acetone in a second glass beaker. The two solutions of step (a) were mixed. This gave a clear mixture of low viscosity. The mixture was allowed to stand at room temperature for 24 hours for hardening. The gel was then removed from the glass beaker, and the liquid (acetone) was removed by drying at 20° C. for 7 days.

The average pore diameter of the resultant material was 3.0 μm. Porosity was 86% by volume, with corresponding density of 226 g/l. Shrinkage was 42%. The flame height measured in the BKZ test was 5 cm.

Example 4 Comp 2.4 g of compound M50 were dissolved in 10.5 g of acetone in a glass beaker at 20° C., with stirring. 1.3 g of compound PMDA were dissolved in 11 g of acetone in a second glass beaker. The two solutions of step (a) were mixed. This gave a clear mixture of low viscosity. The mixture was allowed to stand at room temperature for 24 hours for hardening. The gel was then removed from the glass beaker, and the liquid (acetone) was removed by drying at 20° C. for 7 days.

When the resultant material was compared with example 1, it had a markedly shrunk shape. Shrinkage was 70%. Porosity was 71% by volume, with corresponding density of 390 g/l. The flame height measured in the BKZ test was 7 cm, and it should be noted here that combustibility is reduced by the high density of the material.

The invention claimed is:

1. A process for producing a porous xerogel, comprising:
   a) reacting at least one polyfunctional isocyanate (a1) and at least one polyfunctional aromatic amine (a2) in an organic solvent in the presence of water (a3) and in the presence of at least one catalyst (a5); and then
   b) removing the organic solvent under subcritical conditions to obtain the porous xerogel, wherein (1) a) is carried out in the presence of at least one organic flame retardant (a4), and wherein the at least one organic flame retardant (a4) is soluble in the organic solvent, (2) the at least one polyfunctional isocyanate (a1) consists of at least one member selected from the group consisting of diphenylmethane 4,4'-diisocyanate, diphenylmethane 2,4'-diisocyanate, diphenylmethane 2,2'-diisocyanate, and oligomeric diphenylmethane diisocyanate, (3) the at least one polyfunctional aromatic amine (a2) comprises at least one polyfunctional aromatic amine of the general formula I:

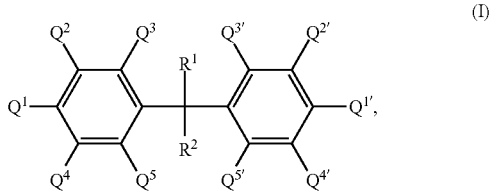

wherein
R¹ and R² can be identical or different and are selected mutually independently from hydrogen and optionally substituted linear or branched alkyl groups having from 1 to 6 carbon atoms, and
Q¹ to Q⁵ and Q¹' to Q⁵' are identical or different and are selected mutually independently from hydrogen, a primary amino group, and an optionally substituted linear or branched alkyl group having from 1 to 12 carbon atoms,
with the proviso that the at least one polyfunctional aromatic amine of the general formula I comprises at least two primary amino groups, wherein at least one of Q¹, Q³, and Q⁵ is a primary amino group, and at least one of Q¹', Q³', and Q⁵' is a primary amino group,
(4) the organic solvent comprises acetone, and
(5) the at least one organic flame retardant (a4) comprises at least one member selected from the group consisting of polybrominated compounds and organophosphorus compounds,
wherein in said reacting step a)
the amount of the at least one polyfunctional isocyanate (a1) is from 76 to 97.5% by weight,
the amount of the at least one polyfunctional aromatic amine (a2) is from 2 to 12% by weight, and
the amount of the water (a3) is from 0.5 to 12% by weight,
all of said amounts based on the total combined weight of the at least one polyfunctional isocyanate (a1), the at least one polyfunctional aromatic amine (a2) and the water (a3), which is 100% by weight, and
wherein
the amount of the at least one catalyst (a5) is from 0.2 to 2.5 parts by weight based on a total of 100 parts by weight of (a1), (a2), (a3) and (a4).

2. The process according to claim 1, wherein Q², Q⁴, Q²', and Q⁴' are selected in such a way that the at least one polyfunctional aromatic amine of the general formula I has at least one linear or branched alkyl group which can bear further functional groups and which has from 1 to 12 carbon atoms in α-position with respect to at least one primary amino group bonded to the aromatic ring.

3. The process according to claim 1, wherein the at least one organic flame retardant (a4) comprises at least one organophosphoric acid derivative.

4. The process according to claim 1, wherein the at least one organic flame retardant (a4) comprises at least one organophosphonic acid derivative.

5. The process according to claim 1, wherein the at least one organic flame retardant (a4) comprises at least one organophosphinic acid derivative.

6. The process according to claim 5, wherein the at least one organic flame retardant (a4) further comprises at least one polybrominated compound.

7. The process according to claim 1, wherein the at least one organic flame retardant (a4) comprises at least one compound which comprises a functional group reactive toward isocyanates.

8. The process according to claim 7, wherein the at least one compound which comprises a functional group reactive toward isocyanates comprises at least 2 functional groups reactive toward isocyanates.

9. The process according to claim 1, wherein the at least one polyfunctional isocyanate (a1) comprises an oligomeric diphenylmethane diisocyanate.

10. The process according to claim 1, wherein the at least one polyfunctional isocyanate (a1) comprises an oligomeric diphenylmethane diisocyanate having a functionality of at least 2.4.

11. The process according to claim 1, wherein the at least one polyfunctional aromatic amine (a2) comprises an oligomeric diaminodiphenylmethane having a functionality of at least 2.4.

12. A porous xerogel obtained by the process according to claim 1.

13. The porous material according to claim 12, wherein the volume-average pore diameter of the xerogel is at most 5 micrometers.

14. The process according to claim 1, wherein the organic solvent consists of acetone.

15. A process for producing a porous xerogel, comprising:
a) reacting at least one polyfunctional isocyanate (a1) and at least one polyfunctional aromatic amine (a2) in an organic solvent in the presence of water (a3) and without the presence of catalyst; and then
b) removing the organic solvent under subcritical conditions to obtain the porous xerogel,
wherein
(1) a) is carried out in the presence of at least one organic flame retardant (a4), and wherein the at least one organic flame retardant (a4) is soluble in the organic solvent,
(2) the at least one polyfunctional isocyanate (a1) consists of at least one member selected from the group consisting of diphenylmethane 4,4'-diisocyanate, diphenylmethane 2,4'-diisocyanate, diphenylmethane 2,2'-diisocyanate, and oligomeric diphenylmethane diisocyanate,
(3) the at least one polyfunctional aromatic amine (a2) comprises at least one polyfunctional aromatic amine of the general formula I:

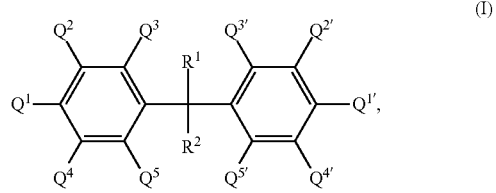

wherein
R¹ and R² can be identical or different and are selected mutually independently from hydrogen optionally substituted and linear or branched alkyl groups having from 1 to 6 carbon atoms, and
Q¹ to Q⁵ and Q¹' to R⁵' are identical or different and are selected mutually independently from hydrogen, a primary amino group, and an optionally substituted linear or branched alkyl group having from 1 to 12 carbon atoms,
with the proviso that the at least one polyfunctional aromatic amine of the general formula I comprises at least two primary amino groups, wherein at least one of $Q^1$, $Q^3$, and $Q^5$ is a primary amino group, and at least one of $Q^{1'}$, $Q^{3'}$, and $Q^{5'}$ is a primary amino group, (4) the organic solvent comprises acetone, and (5) the at least one organic flame retardant (a4) comprises at least one member selected from the group consisting of polybrominated compounds and organophosphorus compounds, wherein in said reacting step a)

the amount of the at least one polyfunctional isocyanate (a1) is from 68 to 90% by weight, the amount of the at least one polyfunctional aromatic amine (a2) is from 2 to 12% by weight, and the amount of the water (a3) is from 8 to 20% by weight, all of said amounts based on the total combined weight of the at least one polyfunctional isocyanate (a1), the at least one polyfunctional aromatic amine (a2) and the water (a3), which is 100% by weight.

16. The process according to claim 15, wherein $Q^2$, $Q^4$, $Q^{2'}$, and $Q^{4'}$ are selected in such a way that the compound at least one polyfunctional aromatic amine of the general formula I has at least one linear or branched alkyl group which can bear further functional groups and which has from 1 to 12 carbon atoms in α-position with respect to at least one primary amino group bonded to the aromatic ring.

* * * * *

UNITED STATES PATENT AND TRADEMARK OFFICE
CERTIFICATE OF CORRECTION

PATENT NO. : 10,125,232 B2  
APPLICATION NO. : 14/225969  
DATED : November 13, 2018  
INVENTOR(S) : Marc Fricke et al.

Page 1 of 1

It is certified that error appears in the above-identified patent and that said Letters Patent is hereby corrected as shown below:

In the Specification

In Column 2, Line 39, delete "and" and insert -- und --, therefor.

In Column 11, Line 31, delete "trimerizaton" and insert -- trimerization --, therefor.

In Column 14, Line 19, delete "2-ethylhexyldehydes," and insert -- 2-ethylhexaldehydes, --, therefor.

In Column 14, Line 22, delete "cyanacetaldehyde," and insert -- cyanoacetaldehyde, --, therefor.

In the Claims

In Column 22, Line 27, Claim 15, delete "presence of" and insert -- presence of a --, therefor.

In Column 22, Lines 57-58, Claim 15, delete "hydrogen optionally substituted and linear" and insert -- hydrogen and optionally substituted linear --, therefor.

In Column 22, Line 60, Claim 15, delete "R5'" and insert -- Q5' --, therefor.

In Column 23, Line 19, Claim 16, delete "the compound" and insert -- the --, therefor.

Signed and Sealed this  
Twenty-first Day of April, 2020

Andrei Iancu  
*Director of the United States Patent and Trademark Office*